Figure 1:
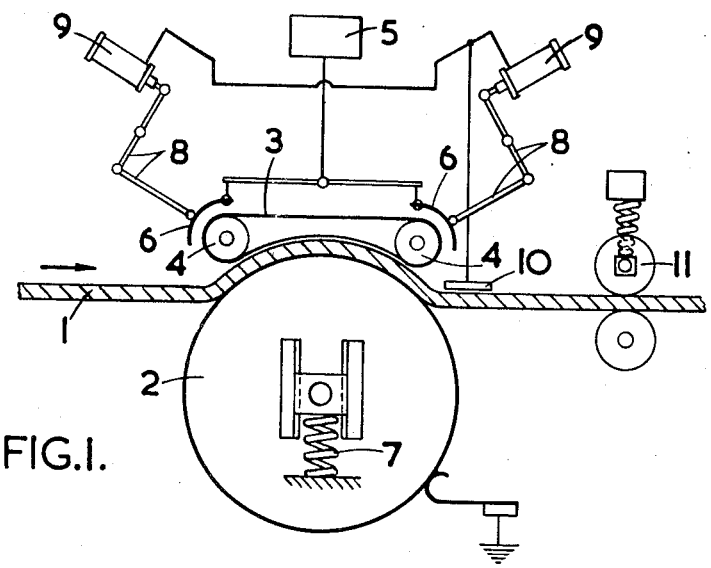

Oct. 9, 1956     A. T. KINDER ET AL     2,766,362

HEAT TREATMENT OF STRIP MATERIAL BY DIELECTRIC HEATING

Filed May 10, 1954     2 Sheets—Sheet 1

INVENTORS
Arthur Thomas Kinder
Kenneth Wilfred Brook
By Maonis & Bateman
ATTORNEYS

2,766,362
Patented Oct. 9, 1956

United States Patent Office

2,766,362

HEAT TREATMENT OF STRIP MATERIAL BY DIELECTRIC HEATING

Arthur Thomas Kinder, Sale, and Kenneth Wilfred Brook, Manchester, England, assignors to Metropolitan-Vickers Electrical Company Limited, London, England, a British company Application May 10, 1954, Serial No. 428,608

Claims priority, application Great Britain May 12, 1953

2 Claims. (Cl. 219—10.53)

This invention relates to heat treatment of strip material by dielectric heating. The invention has an important application inter alia in the heat treatment of multi-layer impregnated fabric belting which is impregnated with a suitable material such as a thermoplastic which, under the heat treatment, consolidates the layers into a single composite belt.

In such a case it is desirable from the production point of view that the strip material has a continuous movement. It follows, therefore, that the heat treatment must be applied over a length of the moving strip in order to prolong the heat treatment sufficiently to obtain the desired effect. If a roller were employed as an electrode it would only give a line contact so that either the strip must move very slowly or its motion must be interrupted, either of which conditions will, of course, slow up production.

The present invention comprises apparatus for the heat treatment, by dielectric heating, of strip material such as belting, including a roller constituting one electrode and an endless metal belt constituting the other electrode, which belt is guided so as to be wrapped partially around the roller so that strip material passing between the belt and roller is held against the roller, together with means for applying suitable R. F. power between the metal belt and the roller.

Preferably in carrying out the invention, the roller constitutes the earthed electrode and the metal belt constitutes the high voltage electrode, and means are provided for feeding the metal belt with high frequency electrical power from a supply source through capacitive couplings provided by condenser plates whose spacing from the metal belt can be adjusted to vary the power supply.

Alternatively the electrical feed to the metal belt can be made by direct coupling with a variable condenser situated at some point remote from the metal belt, for example, the variable condenser may be inside the oscillator compartment.

Conveniently the metal belt passes around a pair of guide rollers which are spaced apart around the circumference of the earthed roller so that the intervening length of belt is wrapped around a sufficient arc of the electrode roller to provide the necessary heating time. Pressure may be applied to the guide rollers of the belt to press the belt against the electrode roller and one way of doing this is to mount the guide rollers on fixed bearings and to mount the electrode roller on a spring pressed bearing. Alternatively, the belt guide rollers may be spring pressed or both electrode roller and the guide rollers may be spring pressed.

In cases in which the guide rollers are spring pressed they may conveniently comprise rollers of wood or other suitable insulating material mounted on steel shafts, the bearings of which are again insulated and the housings of which are spring pressed against the electrode roller.

Conveniently the strip, after passing through the dielectric heater, passes between a pair of pressure rollers which are spring pressed together to complete the consolidation of the belt. Alternatively the pressure rollers may act on the strip wrapped around the roller so as to compress the strip between the rollers and the earthed roller at one or more points.

According to a further feature of the invention, means are provided for automatically varying the capacitive coupling to the high voltage electrode belt by varying the spacing of the supply plates in accordance with the temperature of the belt so as to maintain a sufficiently constant belt temperature.

In order that the invention may be more clearly understood, reference will now be made to the accompanying drawings which illustrate diagrammatically examples of apparatus embodying the invention.

Referring first to Fig. 1 the reference 1 indicates the strip material which is under treatment and which it is assumed progresses from left to right as indicated by the arrows. The dielectric heater comprises a roller 2 which constitutes the earthed electrode and a metal belt 3 which constitutes the high voltage electrode. The metal belt 3 passes around the guide rollers 2. These rollers are spaced apart so that the belt 3 and a length of the strip 1 is wrapped around the surface of the roller 2 so that the length of the path which the material has to traverse whilst subjected to heat treatment prolongs the heat treatment sufficiently to give the desired results.

The high frequency electric power is generated by an oscillator 5 and is fed to the belt 3 through coupling condensers 6. In order to apply pressure to the strip material during the heat treatment the roller 2 is spring-pressed upwardly, as indicated by the reference 7. Clearly the spring pressure may be applied to the rollers 4. The power fed to the metal belt 3 may be conveniently varied by varying the spacing of the plates 6 from the belt 3 by a suitable arrangement such as that indicated by the reference 8 which may be controlled by a control device 9 which in turn is actuated by a temperature-responsive device 10 in such a manner as to vary the spacing of the plates 6 and hence the power supplied so as to tend to maintain the belt temperature substantially constant. The strip material after passing through the dielectric heater may conveniently pass through a pair of spring-pressed pressure rollers 11 to complete the consolidation of the strip material.

Figure 2:
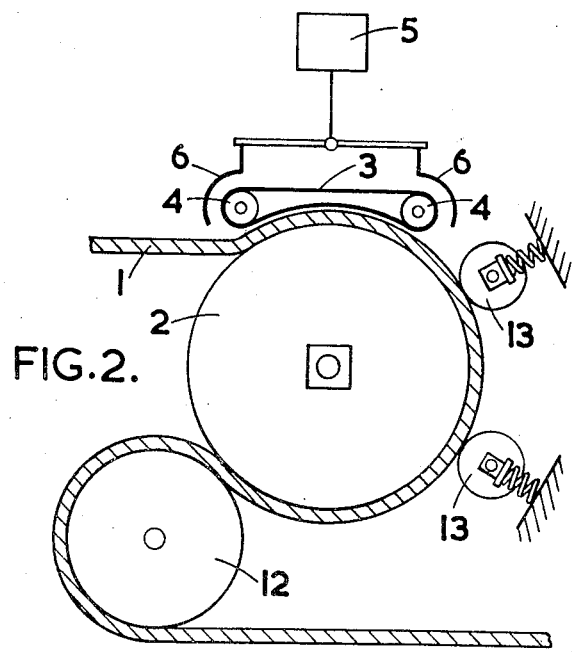

Fig. 2 shows a modified arrangement in which the strip material 1 is wrapped around the roller 2 to an appreciable extent by means of an additional guide roller 12 and the intervening length of strip material is pressed against the roller 2 by spring-pressed pressure rollers 13. With this arrangement the rollers 11 shown in Fig. 1 may be omitted.

It has been found that when the temperature of certain thermo-plastic materials, such as polyvinyl chloride (PVC) approaches the fusing point, there is a tendency for bubbling to occur and at a slightly higher temperature the PVC may stick to the metal band and roller 2. This may be avoided by interposing bands of flexible material having a low power factor between the strip material and the two electrodes. A suitable material is a cloth woven from glass fibres and surface treated with silicone fluid. Alternatively, a glass cloth coated with PTFE (polytetrafluoroethylene) may be employed. The PTFE may be sprayed on to the glass cloth.

Figure 3:
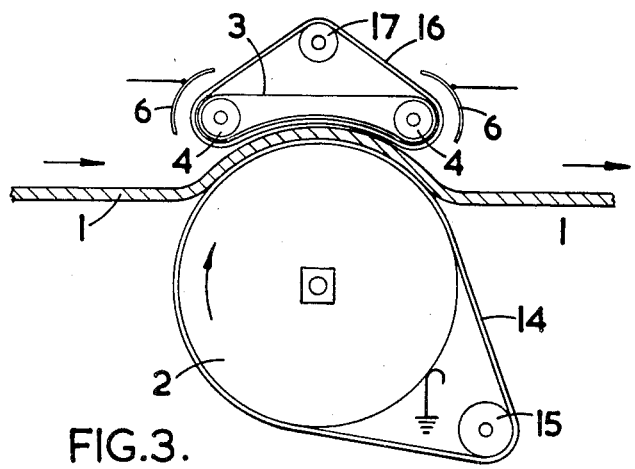

Fig. 3 indicates how the arrangement of Fig. 1 may be modified to avoid this drawback and in this arrangement a band 14 of suitable material such as the silicone or PTFE treated glass cloth is wrapped around the roller 2 and around a guide pulley 15 so as to pass between the peripheral surface of the drum 3 and the strip material 1. A similar band 16 of treated glass cloth is wrapped around the guide pulley 4 underneath the metal belt 3 so that it is interposed between the metal belt 3 and the top surface of the material 1. In the arrangement shown an additional guide pulley 17 is provided to space the belt 16 away from the upper side of the belt 3. Such an arrangement has the advantage that it both reduces the tendency to form bubbles when the material is heated and also reduces the tendency of the PVC or other plastic material to stick when it is in a plastic condition.

It will be appreciated that if desired, PTFE may be applied directly to the surface of the roller 2 and so avoid the need for the belt 14.

Figure 4:
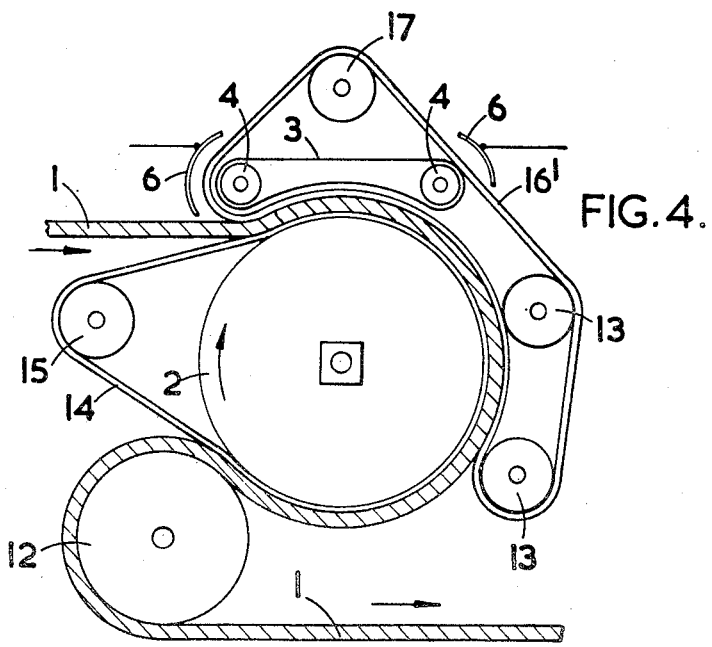

Fig. 4 shows how the silicone-treated bands may be employed when using the arrangement of Fig. 2 and in the arrangement shown the band 16 is replaced by a band 16' which also passes around the pressure rollers 13.

What we claim is:

1. Dielectric heating apparatus for continuously moving strip material such as belting, comprising a roller having at least a metallic periphery constituting one of the electrodes and a flexible metallic belt constituting the other electrode, guide rollers for said belt so positioned that the metallic belt is partially wrapped around the periphery of the roller, and means for applying radio frequency power between the belt and the roller so as to heat the dielectric strip material interposed between said belt and said roller, said supply means comprising condenser couplings between a radio frequency power source and the metallic belt and means for varying said condenser couplings automatically in accordance with the temperature of the strip in such a manner as to tend to maintain the temperature of the strip substantially constant, and means for forcing the roller against the metallic belt so as to ensure that a high and even pressure is applied to the strip material under treatment over substantially all of its heated area.

2. Dielectric heating apparatus for continuously moving strip material such as belting, comprising a roller having at least a metallic periphery constituting one of the electrodes and a flexible metallic belt constituting the other electrode, guide rollers for said belt so positioned that the metallic belt is partially wrapped around the periphery of the roller, and means for applying radio frequency power between the belt and the roller so as to heat the dielectric strip material interposed between said belt and said roller, said supply means comprising condenser couplings between a radio frequency power source and the metallic belt and means for varying said condenser couplings automatically in accordance with the temperature of the strip in such a manner as to tend to maintain the temperature of the strip substantially constant, means for forcing the roller against the metallic belt so as to ensure that a high and even pressure is applied to the strip material under treatment over substantially all of its heated area, and means for passing flexible separating belts coated with polytetrafluoroethylene on both sides of the strip material under treatment so as to be interposed between the roller and the strip material and between the metallic belt and the strip material respectively to prevent sticking.

References Cited in the file of this patent

UNITED STATES PATENTS

| 2,525,356 | Hoyler | Oct. 10, 1950 |
| 2,640,796 | Langer | June 2, 1953 |
| 2,651,708 | Mason et al. | Sept. 8, 1953 |

FOREIGN PATENTS

| 581,181 | Great Britain | Oct. 3, 1946 |
| 609,526 | Great Britain | Oct. 1, 1948 |